United States Patent
Lissel et al.

(10) Patent No.: US 6,686,867 B1
(45) Date of Patent: Feb. 3, 2004

(54) RADAR SENSOR AND RADAR ANTENNA FOR MONITORING THE ENVIRONMENT OF A MOTOR VEHICLE

(75) Inventors: Ernst Lissel, Wolfsburg (DE); Arne Jacob, Braunschweig (DE); Andreas Schlachetzki, Braunschweig (DE); Hergo-H. Wehmann, Meine (DE); Erwin Peiner, Braunschweig (DE); Holger Schroeter, Braunschweig (DE); Gerald Oberschmidt, Fellbach (DE); Carsten Metz, Chatham, NJ (US)

(73) Assignee: Volkswagen AG, Wolfsburg/Fallersleben (DE)

( * ) Notice: Subject to any disclaimer, the term of this patent is extended or adjusted under 35 U.S.C. 154(b) by 0 days.

(21) Appl. No.: 10/048,425

(22) PCT Filed: Jun. 28, 2000

(86) PCT No.: PCT/EP00/06010

§ 371 (c)(1),
(2), (4) Date: Aug. 15, 2002

(87) PCT Pub. No.: WO01/09975

PCT Pub. Date: Feb. 8, 2001

(30) Foreign Application Priority Data

Jul. 30, 1999 (DE) .......................................... 199 35 542
Oct. 23, 1999 (DE) .......................................... 199 51 123

(51) Int. Cl.[7] .............................. G01S 13/93; H01Q 3/46
(52) U.S. Cl. ........................... 342/70; 342/27; 342/368; 343/711; 343/753; 343/754
(58) Field of Search ................................. 342/5–11, 27, 342/28, 70–73, 175, 195, 367–377, 169, 383; 343/753–755, 711–717

(56) References Cited

U.S. PATENT DOCUMENTS 4,408,205 A * 10/1983 Hockham ................... 342/368

(List continued on next page.)

FOREIGN PATENT DOCUMENTS

WO    WO 99/27385    6/1999

OTHER PUBLICATIONS

W. Rotman, "Analysis of an EHF Aplanatic Zoned Dielectric Lens Antenna"; IEEE Trans. on Antennas and Propagation; vol. AP–32, No. 6; Jun. 1984; pp. 611–617.*

C. Metz et al.; "Fully Integrated Automotive Radar Sensor with Versatile Resolution"; IEEE 2001 Microwave Symposium Digest; pp. 1115–1118.*

C. Metz et al.; "Fully Integrated Automotive Radar Sensor With Versatile Resolution"; IEEE Trans. on Microwave Theory and Techniques; vol. 49, No. 12; Dec. 2001; pp. 2560–2566.*

Russell et al., "Millimeter–Wave Radar Sensor for Automotive Intelligent Cruise Control (ICC)," IEEE Transactions on Microwave Theory and Techniques, US, IEEE Inc. (New York), vol. 45, No. 12, Part 02, Dec. 1, 1997, ISSN 0018–9480.

* cited by examiner

Primary Examiner—Bernarr E. Gregory
(74) Attorney, Agent, or Firm—Kenyon & Kenyon

(57) ABSTRACT

A radar sensor and a radar antenna are for monitoring the environment of a motor vehicle. A compact construction is achieved by the planar array of both the control circuit and the radar antenna, so that the radar sensor may be located, for example, in the area of a motor-vehicle bumper. Example configurations consist of the separate line support for arranging lines to transmit high-frequency signals between the control circuit and the radar antenna and the configuration of the radar antenna as a Rotman lens, in relation to the signal propagation times and the layered arrangement of Rotman lens and group antenna.

30 Claims, 6 Drawing Sheets

U.S. PATENT DOCUMENTS

| | | | |
|---|---|---|---|
| 4,658,257 A | * 4/1987 | Izutani et al. | 342/372 |
| 4,803,490 A | * 2/1989 | Kruger | 342/376 |
| 5,675,345 A | 10/1997 | Pozgay et al. | |
| 5,677,697 A | * 10/1997 | Lee et al. | 342/368 |
| 5,734,345 A | * 3/1998 | Chen et al. | 342/367 |
| 5,748,146 A | * 5/1998 | Grove et al. | 342/372 |
| 5,929,802 A | 7/1999 | Russell et al. | |
| 5,959,570 A | * 9/1999 | Russell | 342/70 |
| 6,107,956 A | * 8/2000 | Russell et al. | 342/70 |
| 6,114,985 A | * 9/2000 | Russell et al. | 342/169 |
| 6,441,785 B1 | * 8/2002 | Rosen et al. | 342/383 |

* cited by examiner

RADAR SENSOR AND RADAR ANTENNA FOR MONITORING THE ENVIRONMENT OF A MOTOR VEHICLE

FIELD OF THE INVENTION

The present invention relates to a radar sensor and a radar antenna, which are particularly suitable for monitoring the vicinity of a motor vehicle.

BACKGROUND INFORMATION

Such radar sensors are needed for various comfort-related and safety-related driver-assistance systems. They use sensors aligned in the forward direction of travel, in order to gather information about the traffic and obstacles on the road. This information these information items are used by the corresponding driver-assistance system, in order to implement automatic vehicle-to-vehicle ranging or to carry out an automatic emergency-braking function, or for applications from the area of adaptive driving control, collision prevention, and for the future, autonomous driving of vehicles.

Described in IEEE Transactions on Microwave Theory and Techniques, VOL. 45, NO. 12, December 1997, "Millimeter-Wave Radar Sensor for Automotive Intelligent Cruise Control (ICC)", M. E. Russell et al., is a radar sensor, which has a control circuit and a radar antenna, the control circuit being in the form of a transceiver module, and the radar antenna being connected to the control circuit by at least one lead. In this context, a part of the control circuit is in the form of an MMIC (monolithic millimeterwave integrated circuit). In addition, the radar antenna is in the form of a printed circuit and has a Rotman lens and a group antenna. The Rotman lens has a lenticular parallel-plate line, at least two supply leads, a plurality of coupling leads, and delay lines. In addition, the group antenna is made of a plurality of individual antennas, which are connected in series in at least two rows. Each of these rows of individual antennas is connected to a delay line, which transmits the high-frequency signal supplied by the parallel-plate line to the associated coupling lead, to the row of individual antennas.

In the case of the radar sensor represented above, there is a problem with the connection or coupling of the MMIC modules to the radar antenna, since differently dimensioned circuits situated on different substrates must be interconnected. In this case, losses often occur, since the connecting lines are not optimally adapted for the transmission of high-frequency signals.

A further disadvantage of the conventional radar antenna is that, in the case of transmitting high-frequency signals between the group antenna and the Rotman lens, a defined phase relation is indeed present between the specific rows of the individual antennas and the associated coupling leads of the Rotman lens. However, a variable amplitude distribution of the high-frequency signals to the separate rows of individual antennas of the group antenna is not possible in this radar antenna. Thus, the directional characteristic of the group antenna cannot be adjusted in an optimum manner.

In addition, the above-described conventional radar antenna has the problem of the entire radar sensor occupying a large volume, due to the Rotman lens and the group antenna being positioned at right angles to each other. Therefore, the dimensional requirements for a radar sensor cannot be fulfilled to an extent satisfactory for, e.g., positioning it in the region of the bumper of a motor vehicle.

Therefore, it is an object of the present invention to provide a radar sensor and a radar antenna in which the previously described disadvantages are eliminated.

SUMMARY

According to a first aspect of the present invention, the above-mentioned engineering problem is solved by providing a radar sensor having a control circuit, which is in the form of a transmitting and/or receiving module and has at least one MMIC (monolithic millimeter-wave integrated circuit), and having a radar antenna, which is connected to the control circuit by at least one lead and has a Rotman lens and a group antenna, the control circuit and the radar antenna essentially being positioned in parallel with each other.

The planar form of the entire radar sensor results in a more compact construction occupying a smaller volume, so that the radar sensor of the present invention may be easily integrated into the region of the bumper of a motor vehicle.

An example embodiment of the present invention provides for a conductor support, lines for transmitting high-frequency signals between the control circuit and at least one lead of the radar antenna being situated on the conductor support, and the conductor support being situated between the control circuit and the radar antenna.

The above-mentioned construction of the radar sensor allows the signal transmission between the variably dimensioned modules, e.g., the at least one MMIC component and the radar antenna, to be effectively implemented by an additional module. To this end, the lines situated on the additional conductor support may be manufactured prior to assembling the radar sensor, and therefore, the actual connections between the at least one MMIC component and the radar antenna may be manufactured in a simple manner, after assembly, including that of the conductor support. This ensures that the lines arranged on the conductor support are suitably dimensioned at their points of connection to the least one MMIC component and to the radar antenna.

In this context, the lines on the conductor support may essentially extend in one plane, parallelly to the printed circuit traces of the control circuit and to the at least one lead of the radar antenna. If these lines are also positioned essentially at the same elevation as the control circuit and the radar antenna, then the result is a configuration of the different line elements, which essentially extend in one plane. The consequently produced, electrical and electromagnetic connections between the different modules are therefore reduced to a minimum, so that occurring losses are minimized.

The lines may be in the form of microstrip transmission lines on the conductor support, which may be particularly suited for transmitting high-frequency electromagnetic signals.

A further example embodiment of the present invention provides for a circuit support, to which the at least one MMIC component of the control circuit, the conductor support, and at least part of the radar antenna are connected, e.g., using an adhesive. Therefore, the circuit support may also be referred to as a multichip module. Thus, a unit is formed by all of the components, which are interconnected by a circuit support. In addition, transmission lines for transmitting signals between the lines of the conductor support and the supply leads of the radar antenna may also be formed on the circuit support. Thus, the circuit support also assumes tasks that are partially functional.

On one hand, wire-bonding connections, and on the other hand, electromagnetic field couplings are possible as options for a connection between the lines of the conductor support and the at least one lead of the radar antenna. In the case of the wire-bonding connection, the connecting elements may be cut in a highly exact manner, since the electrical properties of the wire-bonding connection substantially depend on its precision. In addition, a connection using electromagnetic field coupling allows higher manufacturing tolerances of the individual elements, but requires more expenditure for circuit design.

An advantage of the above-mentioned configuration is the modularity, for different control circuits in the form of pre-fabricated MMIC components may be used with the same radar antennas for different application purposes. The assembly and connection are performed on the circuit support.

In addition, it should be pointed out that the arrangmenet of the above-described, present invention is independent of the particular form of the radar antenna.

According to a second aspect of the present invention, the above-mentioned engineering problem is solved by a radar antenna including a Rotman lens having a lenticular parallel-plate line, at least two supply leads, a plurality of coupling leads, and delay lines, and including a group antenna having a plurality of individual antennas, which, in each case, are connected in series in at least two rows. Each row is connected by an antenna terminal to a delay line, which transmits the high-frequency signals supplied by the parallel-plate line to the corresponding coupling lead, to the row of individual antennas. The lengths of the delay lines are selected for a predetermined frequency of the high-frequency signal, in such a manner, that, in response to the high-frequency signal being applied to each of the supply leads, signals having a predetermined phase distribution are applied to the antenna leads. For a predetermined frequency of the high-frequency signal, the signal propagation delays, which occur between the supply leads and the antenna leads, are changed by an essentially integral multiple of the signal period, for different delay lines, in order to preselect an amplitude distribution of the signals applied to the antenna terminals.

In this context, the signal propagation times for outer delay lines may be lengthened in comparison with inner delay lines. An advantage of this refinement is that, in comparison with the conventional radar antenna, not only is a suitable phase occupancy achieved at the rows of individual antennas of the group antenna, but it is possible to selectively set the amplitude distribution of the signals applied to the rows of individual antennas, as well.

In this context, different geometric lengths of the delay lines predetermine the signal propagation times along the delay lines. However, it is possible to preselect the signal propagation times along the delay lines, using different dielectric constants for the substrates utilized for the delay lines. The high-frequency signals having a phase relationship predetermined by the supplied signal may be sent to the different rows of individual antennas. This is possible due to the narrow-band characteristic of the high-frequency signal to be transmitted, since the frequency differences within the band width of the high-frequency signal only result in negligible phase differences based on different signal propagation times. This allows a very precise directivity characteristic to be achieved for the group antenna.

According to a third aspect of the present invention, the above-mentioned engineering problem is solved by a radar antenna including a Rotman lens having a lenticular parallel-plate line, at least two supply leads, a plurality of coupling leads, and delay lines, and including a group antenna having a plurality of individual antennas, which, in each case, are connected in series in at least two rows. The Rotman lens and the group antenna are positioned so as to be essentially parallel to each other and spaced apart.

This arrangement may achieve a space-saving configuration of the Rotman lens and group antenna, so that a planar design of the radar antenna and the radar sensor is possible, thereby simplifying their use in a motor vehicle. Thus, it is possible, for example, to integrate a flat radar sensor and a flat radar antenna into the bumper of a motor vehicle. The radar sensor includes the arrangement of the Rotman lens and the group antenna next to each other on a substrate.

The Rotman lens and the group antenna may be formed on two different substrates, the sides of the two substrates facing away from the Rotman lens and the group antenna being connected to each other, and a common metallic coating being situated between the two substrates. This metallic layer may be used as a common ground for the Rotman lens and the group antenna.

Coupling slits may be formed in the metallic layer, which electromagnetically couple the antenna terminals of the rows the group antenna's individual antennas, to the connection points of the delay lines. Two important advantages are associated with this. First of all, there is no need to produce a metallic connection between the delay lines and the rows of individual antennas. Secondly, the electromagnetic field generated by the Rotman lens only affects the group antenna at the coupling slits provided for this purpose. In addition, the metallic layer is used as a shield between the Rotman lens and the group antenna.

The connection points of the rows of individual antennas may be essentially situated in the center of the rows, whereby a symmetric amplitude distribution to the individual antennas inside a row of individual antennas is achieved. This further improves the directivity characteristic of the radar antenna.

Additional features and advantages of the present invention are explained in detail in the following description of example embodiments.

DETAILED DESCRIPTION

Figure 1:
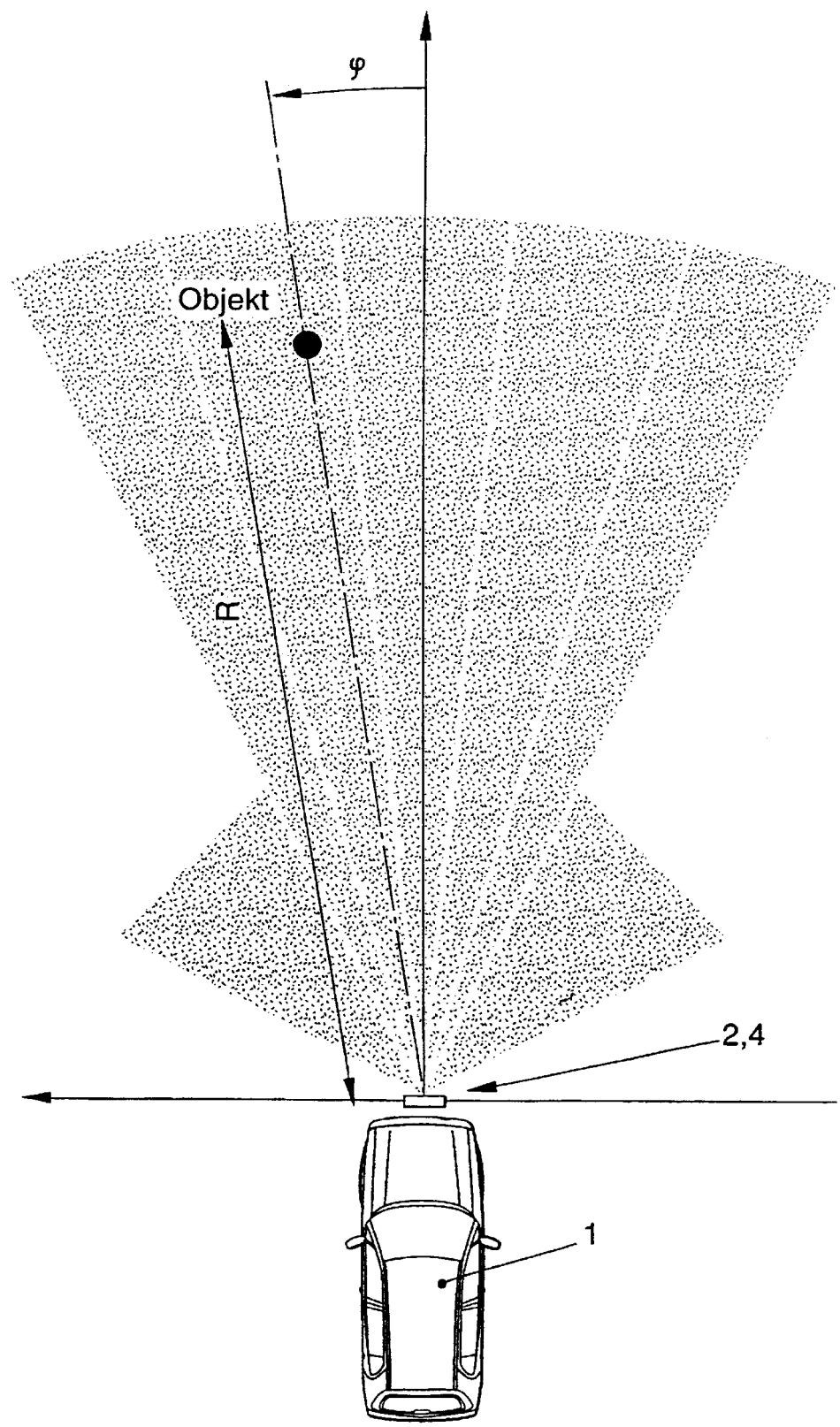
FIG. 1 is a schematic view of a motor vehicle having a radar sensor according to the present invention, where the radiation characteristic is illustrated.

FIG. 1 illustrates a motor vehicle 1, which has a radar sensor 2 on its front end in the region of the bumper, the radar sensor including a radar antenna 4, which has an azimuthal directivity characteristic possessing a separate sensitivity for different angular segments φ. Therefore, objects may be detected in an angularly resolved manner in order to characterize the vicinity of motor vehicle 1. In addition to angle φ, it is also possible to determine distance R and relative speed v, so that vehicles traveling ahead or objects on the roadway may be detected, in order to consequently control the handling of motor vehicle 1.

Figure 2:
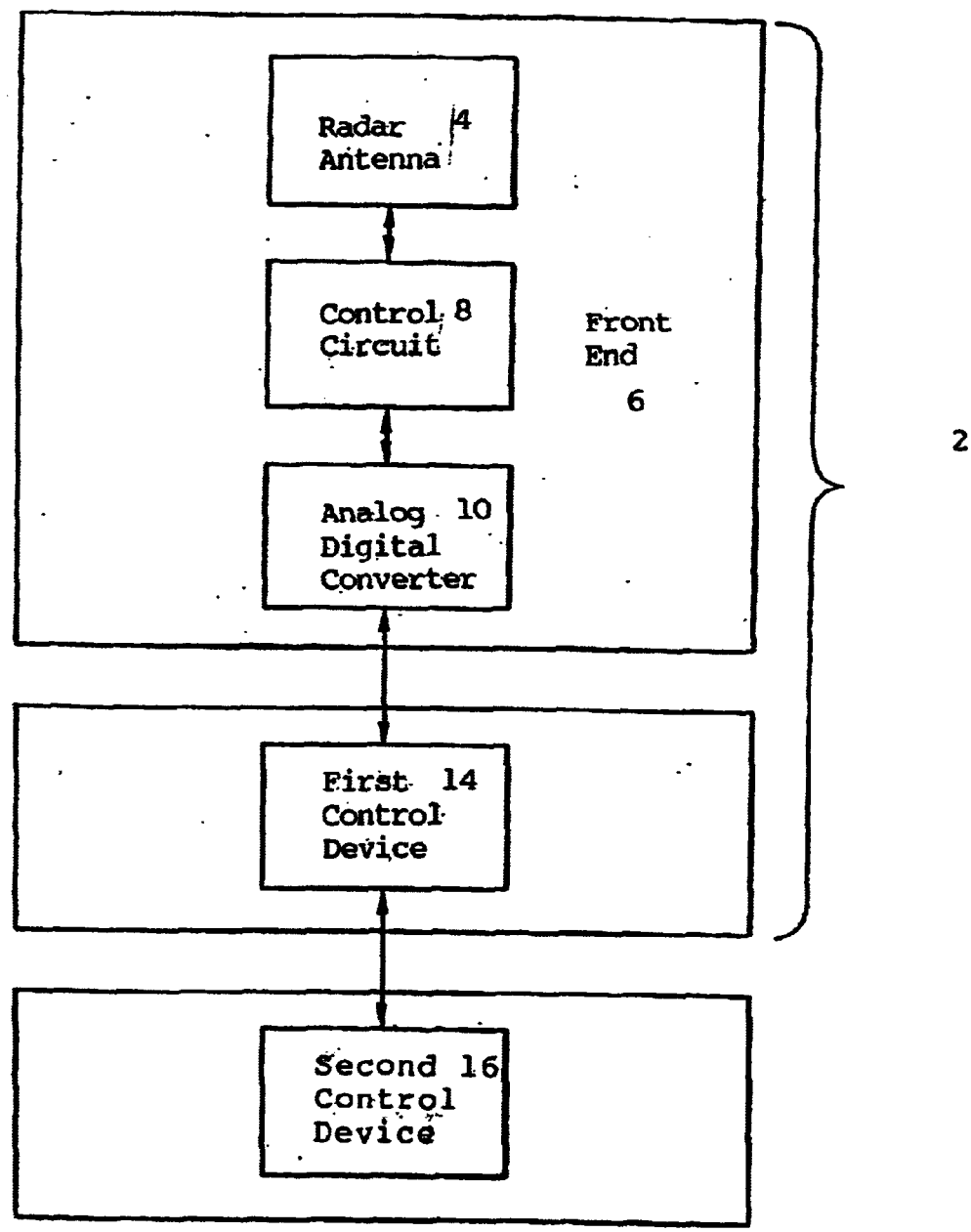
FIG. 2 is a block diagram of the radar sensor according to the present invention.

FIG. 2 illustrates the general configuration of the entire radar sensor, as well as that of a subsequent evaluation system, using a block diagram. Radar antenna 4, a control circuit 8, and an analog-digital converter 10 are situated in front end 6. In this context, control circuit 8 takes the form of a transmitting and/or receiving module and has at least one MMIC component. Radar antenna 4 is connected to control circuit 8 by at least one lead 12.

Analog-digital converter 10 is connected to a first control device 14, which is in the form of an electronic control unit that is connected, in turn, to a second control device that, for example, takes the form of an evaluator inside the vehicle. The signals received by radar antenna 4 are evaluated in this evaluator, in order to control the handling of motor vehicle 1 in a suitable manner. However, the electronic control unit of first control device 14 is not only used to evaluate the signals received by radar antenna 4, but also to activate radar antenna 4 so that it emits radar signals. The radar antenna 4 in the example embodiment illustrated in FIG. 2 is configured to be monostatic and is therefore used as both a transmitting antenna and receiving antenna. However, a bistatic example embodiment of the radar sensor, which has two different radar antennas 4, of which one is used as a transmitting antenna and the other is used as a receiving antenna, is, of course, also possible. These may be dimensioned differently and may be adapted, in each case, to the requirements for a transmitting or receiving antenna. Thus, a small transmitting antenna may be sufficient for completely covering the range to be monitored, while the receiving antenna has a larger antenna surface because of the necessary angular resolution.

Control circuit 8, which is configured as a transceiver module, is a central unit of the radar sensor 2 according to the present invention. First of all, the central unit has the task of providing radar antenna 4 with the frequency-modulated radar signal at a sufficient power. Secondly, control circuit 8 mixes the signal received by radar antenna 4 with a local oscillator signal, so that a signal is formed in the baseband. As the transceiver module, control circuit 8 therefore represents the interface between the signal processing and radar antenna 4 or radar antennas 4. In the example embodiment of the radar sensor 2 according to the present invention, both radar antenna 4 and control circuit 8 are assembled using planar technology. As indicated above, control circuit 8 has MMIC components for this purpose.

Figure 3:
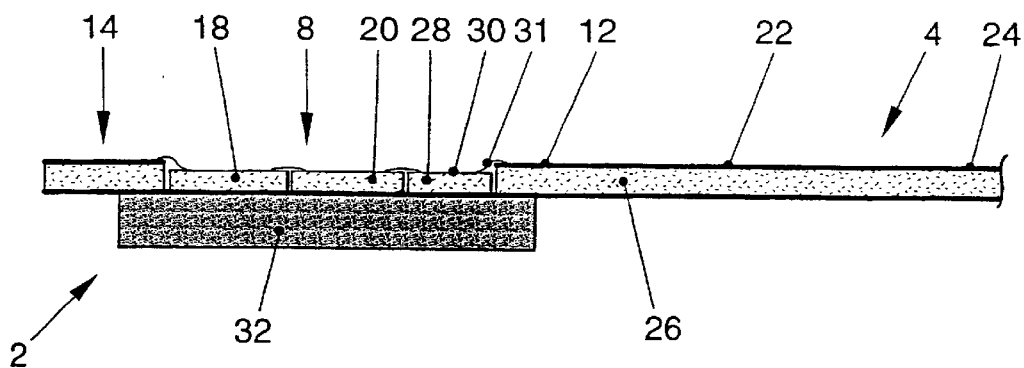
FIG. 3 is a cross-sectional view of a first example embodiment of a radar sensor according to the present invention.

A first example embodiment of a radar sensor according to the present invention is schematically illustrated in FIG. 3. Control circuit 8 has two MMIC components 18 and 20, which, inter alia, perform the functions of the oscillator and an I/O mixer. In addition, the radar sensor has a planar radar antenna 4, which, as explained below in detail, has a Rotman lens 22 and a group antenna 24 that are deposited on a substrate 26.

In addition, a conductor support 28 is provided, on which lines used for transmitting high-frequency signals between MMIC components 18 and 20 of control circuit 8, and leads 12 of radar antenna 4, are formed. For this purpose, conductor support 28 is positioned between control circuit 8, i.e., MMIC components 18 and 20, and radar antenna 4.

As also illustrated in FIG. 3, lines 30 formed on conductor support 28 essentially extend in a plane parallel to the printed circuit traces of control circuit 8, and parallel to leads 12 of radar antenna 4. This arrangement may allow the connections between lines 30 and the leads 12 of radar antenna 4, and the connections between the lines and MMIC components 18 and 20 to be configured to be short. In particular, this minimizes the losses during the transmission of the high-frequency signals.

This is especially true, when lines 30 essentially extend on the same level as the printed circuit traces of control circuit 8, as is illustrated in FIG. 3. Since the difference in elevation between conductor support 28 and the leads 12 to radar antenna 4 is also small, the advantageous effect of short connections is also produced in this case. A wire-bond connection 31 has been selected as the present connection.

Lines 30 are accommodated in a very effective manner for transmitting high-frequency signals, by configuring the lines to be microstrip transmission lines on conductor support 28. To this end, conductor support 28 is manufactured, for example, from GaAs or $AL_2O_3$.

GaAs-based microstrip transmission lines are manufactured in a plurality of manufacturing steps.

In a first step, a wafer is divided into specimens, the sizes of which suitable for manufacturing the conductor supports. This is done by using a diamond to scribe a rupture joint, and by breaking the wafer over an edge. The wafer piece is then thinned down to a necessary thickness, using a wet-chemical, etch-polishing process. Apart from the etching attack of the etching solution, e.g., bromine-methanol solution, the reduction in thickness is also aided by pure mechanical abrasion on a polishing cloth. The wafer pieces are subsequently scrubbed free of impurities, in order to insure that the metallic coating adheres well to the GaAs. To this end, both the intrinsic oxide and organic contaminants are removed from the semiconductor surface. The metallization is performed immediately afterwards, in order to prevent the intrinsic oxide from forming again on the surfaces of the specimens. The metallic coating includes a 10 nm thick chromium adhesive base, a 100 nm thick, vapor-deposited gold layer, and 3 μm of galvanically deposited gold. Since a microstrip transmission line has its ground potential on the bottom side of the substrate, both sides of the wafer piece used as a substrate may be metallized. Prior to the subsequent lithography, the specimen made up of the substrate and the metallic coating is bonded to a glass support, using a photosensitive resist. First of all, this step facilitates the handling of the sensitive GaAs, and secondly, the metallic coating on the back of the specimen is protected during etching. After the etching step, the photosensitive resist is dissolved in acetone, and the specimen is therefore detached from its support. In order to ensure that no photo-resist residues remain on the specimen, they undergo a photo-resist incineration step so that, above all, no photo-resist residues resulting in deteriorated adhesion of a bonding wire remain on the printed circuit traces. Finally, the specimens are cut to size in a highly precise manner, so as to match the GaAs conductor supports.

As FIG. 3 further illustrates, a circuit support 32 is provided, which represents a stable base for mounting sensitive MMIC components 18 and 20, as well as a stable base for conductor support 28. To this end, they are joined to circuit support 32 by an adhesive. In addition, a part of radar antenna 4 is connected to circuit support 32, as well. In order to provide a stable base for the various elements, the material of circuit support 32 is adapted to the thermal expansion properties of the substrates of MMIC components 18 and 20, circuit support 28, and radar antenna 4, since large temperature differences especially occur during use in a motor vehicle. For this purpose, $AL_2O_3$ was selected in the present example embodiment. In addition, lines for the voltage supply and for connection to first control device 14 are directly formed on the substrate of circuit support 32.

Circuit support 32 also has another function, which is explained in detail in connection with the second example embodiment illustrated in FIGS. 4 and 5.

Figure 4:
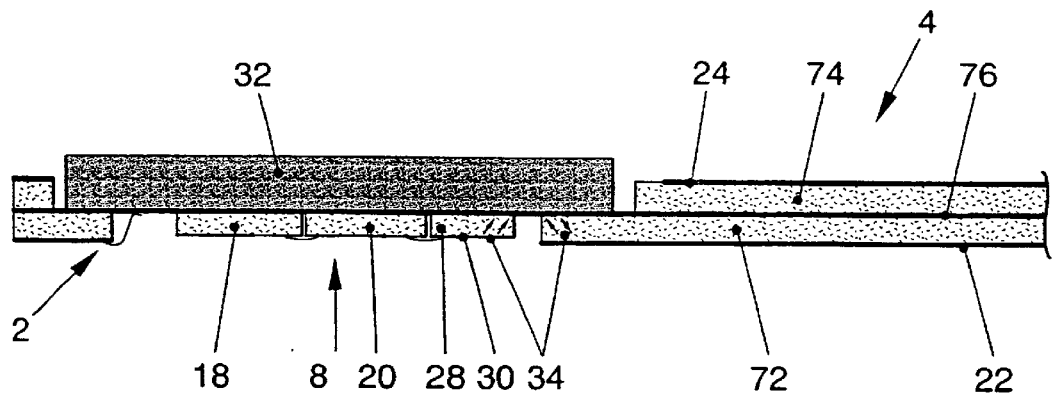
FIG. 4 is a cross-sectional view of a second example embodiment of a radar sensor according to the present invention.

As illustrated in FIG. 4, this example embodiment also provides for MMIC components 18 and 20, conductor support 28, and a part of radar antenna 4 being joined to circuit support 32. In contrast to the example embodiment illustrated in FIG. 3, circuit support 28 is, however, not connected using a wire-bonding connection 31, but rather with the aid of an electromagnetic field coupling 34, as is explained in detail with reference to FIG. 5.

Figure 5:
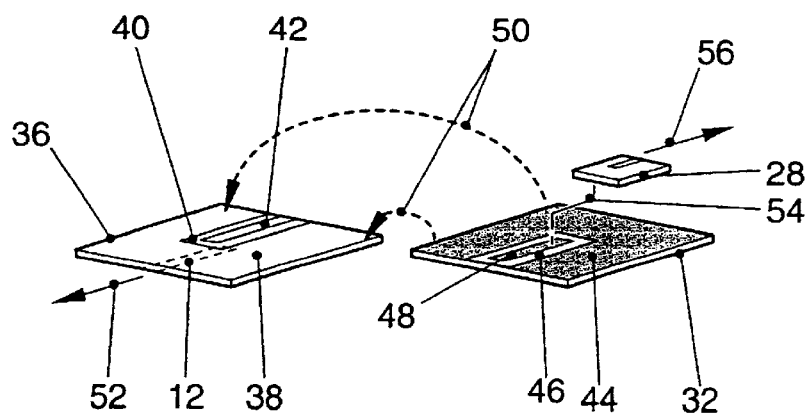
FIG. 5 is an exploded view illustrating the assembly of a circuit support.
Figure 7:
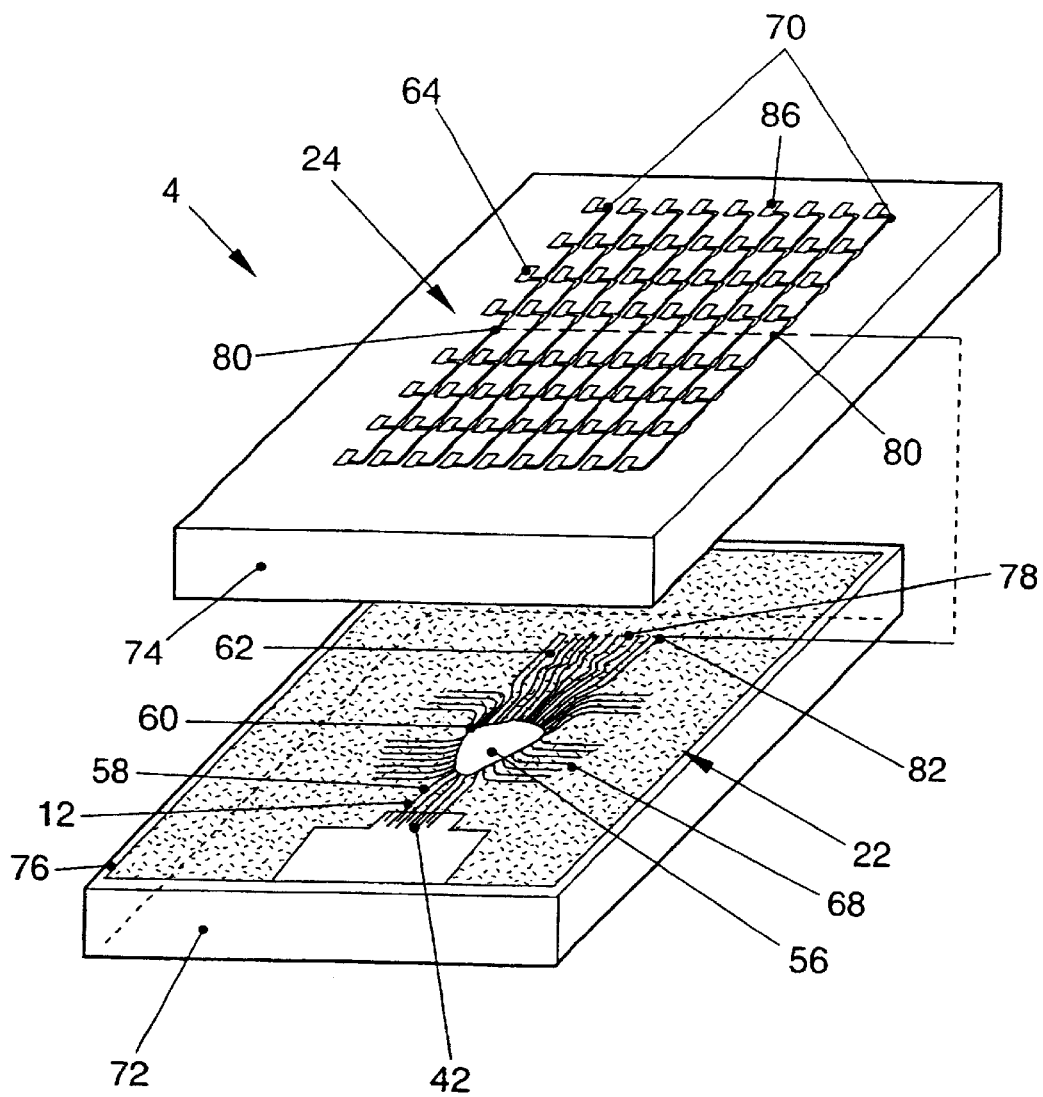
FIG. 7 is an exploded view of a second example embodiment of a radar antenna according to the present invention.

On its upper side illustrated in FIG. 5, substrate 36, on which at least a part of radar antenna 4 is formed, e.g., in the form of Rotman lens 22, has a metallic grounding coating that includes a notch 40 and a coplanar line 42. A metallic grounding coating 44, a notch 46, and a coplanar line 48 are formed on the upper surface of circuit support 32 illustrated in FIG. 5, so as to be symmetric to the shape of the surface of substrate 36. As is indicated by arrows 50, the upper surface of circuit support 32 illustrated in FIG. 5 is turned over and positioned on substrate 36, whereby the two coplanar lines 42 and 48 abut against each other so as to at least partially overlap. Therefore, an electrical contact is formed between the two coplanar lines 42 and 48. In addition, the configuration of coplanar lines 42 relative to leads 12 is illustrated in FIG. 7.

A lead 12, which is in the form of a microstrip transmission line, is indicated by dashed lines in FIG. 5, on the lower side of substrate 36. In this context, arrow 52 points in the direction of radar antenna 4, e.g., in the direction of Rotman lens 22.

On the other side, conductor support 28, which has a line 30 in the form of a microstrip transmission line, is attached to circuit support 32 on the surface opposite to line 30, as is illustrated by arrow 54. However, arrow 56 points in the direction of control circuit 8, to which line 30 is connected.

Both lead 12 and line 30 are not electroconductively connected to coplanar lines 42 and 48, respectively, but are set apart from coplanar lines 42 and 48, respectively, by substrates 36 and 32, respectively. Therefore, line 30 and lead 12 are electromagnetically interconnected by a series circuit of two coplanar microstrip junctions. The first junction connects conductor support 28 to circuit support 32, and the second junction ensures that Rotman lens 22 is coupled to circuit support 32. In this context, the two coplanar lines 42 and 48 are galvanically connected, using a flip-chip assembly. This not only simplifies assembly, but also reduces electrical losses in comparison with a wire-bonding connection. Last but not least, the above-described, modular construction of the radar sensor is simplified by the flip-chip assembly, since different MMIC components of different control circuits may be connected to circuit support 32 and radar antenna 4 without any serious adaptation problems. In addition, the above-described method of construction saves space.

Figure 6:
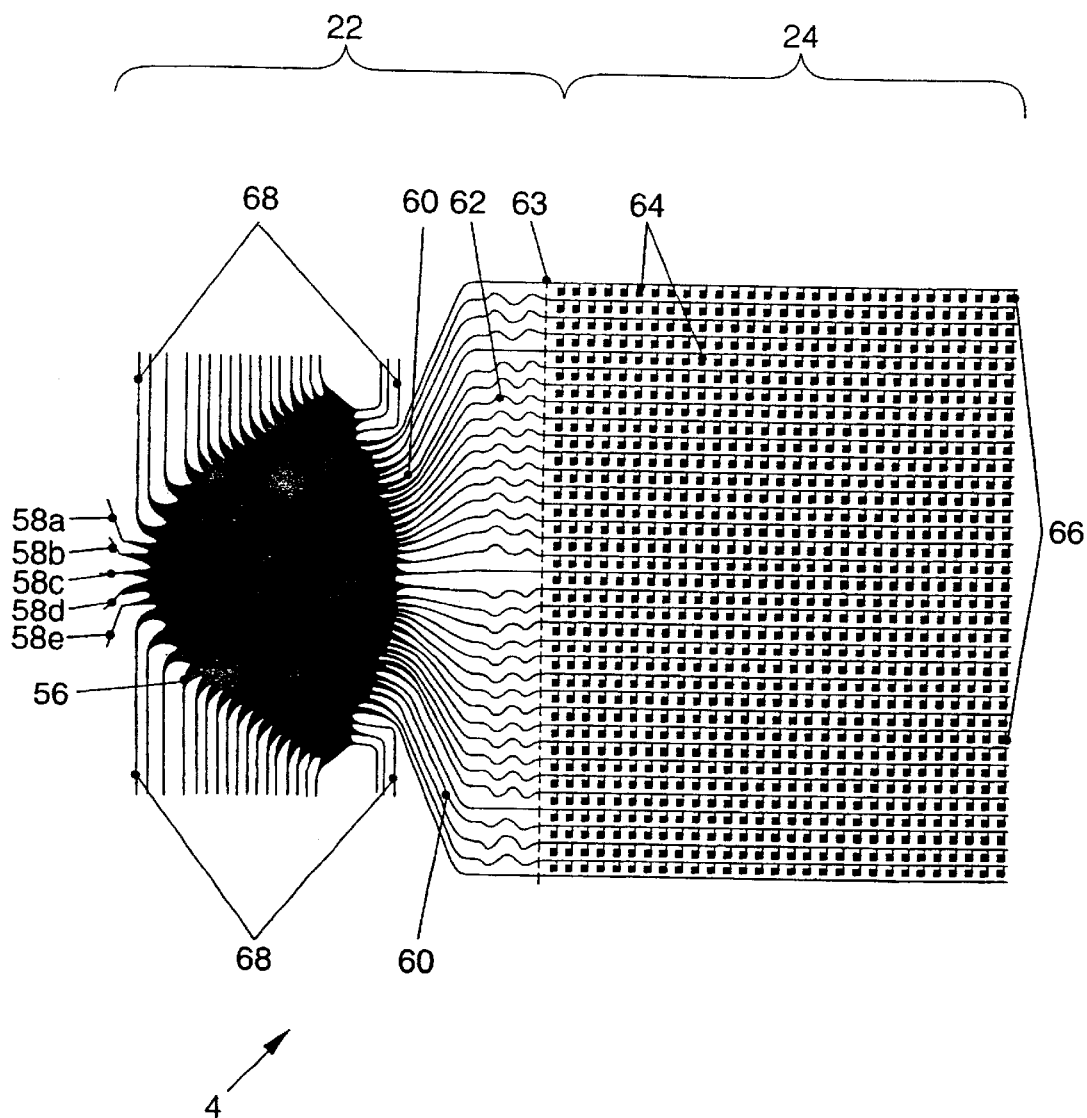
FIG. 6 is a plan view of a first example embodiment of a radar antenna according to the present invention.

Illustrated in FIG. 6 is a first example embodiment of a radar antenna 4 according to the present invention, which may be used in the above-described example embodiments of radar sensor 2. Radar antenna 4 has a Rotman lens 22, which includes a lenticular parallel-plate line 56, five supply leads 58a through 58e, a plurality of coupling leads 60, and delay lines 62. In addition, radar antenna 4 has a group antenna 24, which includes a plurality of individual antennas 64 that are connected in series to form a plurality of rows 66. Provided for each row 66 of individual antennas 64 is a delay line 62, which transmits the high-frequency signal supplied by parallel-plate line 56 to the corresponding coupling lead 60, to the row 66 of individual antennas. All other leads 68 are used to electrically terminate parallel-plate line 56 and are covered by an absorbing material, which may be in the form of a film. In order to prevent multiple reflections inside the region of parallel-plate line 56, all of the leads, i.e., supply leads 58a to 58e, coupling leads 60, as well as terminating leads 68, are converted into microstrip transmission lines in an impedance-matched manner, using Klopfenstein tapers. In this context, the supply leads 58a to 58e illustrated on the left in FIG. 6 lead into electronic control circuit 8, and the coupling leads 60 illustrated on the right lead into group antenna 24.

The shape of parallel-plate line 56 and delay lines 62 is such that, in response to a suitable excitation in the focal plane, which extends in the region of supply leads 58a through 58e in FIG. 6, a specific phase occupancy is produced at the antenna terminals 63 illustrated in FIG. 6. Therefore, in the case of a high-frequency signal of narrow bandwidth and its being fed through central supply lead 58c, a high-frequency signal having the same phase is applied to coupling leads 63. But if the high-frequency signal is supplied to one of the two outer supply leads 58a or 58e, then a signal is applied to coupling leads 63, which specifies a fixed phase relationship but has a phase shift between individual coupling leads 60. In this context, parallel-plate line 56 and delay lines 62 are configured in such a manner, that the phase relationship extends linearly from the upper to the lower coupling terminals 63 illustrated in FIG. 6. Parallel-plate line 56 is configured so that an exactly linear phase characteristic is achieved for three focal points of the lens. For example, the two outer supply leads 58a and 58e and central supply lead 58c represent the three focal points of the Rotman lens.

According to the present invention, the signal propagation delays occurring between supply leads (58) and antenna terminals 63 are changed for different delay lines (62), for a predetermined frequency of the high-frequency signal, by essentially integral multiples of the signal period, in order to specify an amplitude distribution of the signals applied to antenna terminals (63). In this context, the signal propagation times for outer delay lines (62) are may be increased in comparison with inner delay lines (62).

On one hand, this ensures that the high-frequency signals, which are applied to coupling terminals 63 and have their predetermined phase relationship, are supplied to rows 66 of individual antennas 64. If, for example, central supply lead 58c receives the high-frequency signal, then signals having a phase shift essentially equal to zero are formed at coupling terminals 63.

But since, on the other hand, outer delay lines 62 purposely have a greater length than central delay lines 62, the high-frequency signals are more sharply attenuated on the outside, so that an amplitude distribution having a higher amplitude in the middle and a lower amplitude on the outside forms inside group antenna 24. This allows the directivity characteristic of group antenna 24 to be influenced in an advantageous manner.

In the example embodiment illustrated in FIG. 6, the different signal propagation times along delay lines 62 are predetermined by different geometric lengths. This may be seen from the greater or lesser degrees of curvature of the delay-line 62 contours. It is also possible to adjust the signal propagation times by using substrates for the delay lines, which have different dielectric constants, since the electromagnetic signals propagate along the delay lines, and their propagation time is affected by the dielectric constant of the substrate.

The phase-specific control of individual antennas 64 of group antenna 24 allows the directivity characteristic of radar antenna 4 to be adjusted in a very precise manner. In each case, the directivity characteristic of the antenna has a major lobe, while minor lobes, the intensity of which is markedly less than that of the major lobe, appear in both azimuthal directions. The azimuthal orientation of the major lobe may be controlled by variably activating the Rotman lens via different supply leads 58a through 58e, for the direction of the major lobe is shifted as a function of the phase relationship between the different individual antennas 64. In this manner, an angular resolution of radar antenna 4 may be achieved solely by electronics, without mechanically adjusting it.

As described above, the directivity characteristic of group antenna 24 may also be controlled by applying a signal to upper and lower rows 66 of individual antennas 64 illustrated in FIG. 6, the amplitude of the signal being less than that for central rows 66 illustrated in FIG. 6. This concentrates the generation of electromagnetic radiation in the center of planar group antenna 24. In this context, control by variable amplitude is achieved in that the delay lines for outer rows 66 are considerably longer than those for central rows 66, which means that the high-frequency signal is more sharply attenuated before entering outer rows 66, than in the case of central delay lines 62. Therefore, attenuation effects alone achieve a suitable amplitude distribution of the high-frequency signals inside group antenna 24.

As is illustrated in FIG. 6, each of the delay lines 62 is connected to one of the two ends of rows 66 of individual antennas 64. In this context, Rotman lens 22 and group antenna 24 are formed on one substrate, which essentially corresponds to the example embodiment illustrated in FIG. 3. Therefore, Rotman lens 22 and group antenna 24 are essentially situated in one plane, which allows a planar construction of the entire radar antenna.

Illustrated in FIG. 7 is an exploded view of a second example embodiment of a radar antenna 4 according to the present invention. In this case, Rotman lens 22 also has the previously described parallel-plate line 56, supply leads 58, coupling leads 60, and delay lines 62. In addition, group antenna 24 has individual antennas 64, which are series-connected in rows 70. In this case, rows 70 of individual antennas differ from those of the first example embodiment in that, as is described below in detail, the coupling of the electromagnetic signals mainly occurs in the center of rows 70. The present invention provides for Rotman lens 22 and group antenna 24 being spaced apart and positioned in parallel with each other. In contrast to the planar construction in the first example embodiment, Rotman lens 22 and group antenna 24 are therefore positioned one over another, so as to at least partially overlap. For this purpose, Rotman lens 22 is formed on a first substrate 72, and the group antenna is formed on a second substrate 74. The sides of the two substrates 72 and 74 facing away from Rotman lens 22 and group antenna 24, respectively, are interconnected by a common metallic coating 76. In this context, metallic coating 76 is used as a common ground potential. The above-described two-layer construction of radar antenna 4 is likewise illustrated in FIG. 4, as well as in FIG. 8.

Rotman lens 22 and group antenna 24 are coupled, using electromagnetic field coupling, as described above for the various components of radar sensor 2. To this end, coupling slits 78 are formed in metallic coating 76, which electromagnetically couple connecting points 80 of the rows 70 of individual antennas 64 to contact points 82 of delay lines 62.

Therefore, the electromagnetic field, starting from contact points 82, is transmitted through substrate 72, through coupling slits 78, through substrate 74, to connecting points 80 of group antenna 24. Since metallic coating 76 is also formed over the whole surface, Rotman lens 22 is effectively shielded from group antenna 24.

Figure 8:
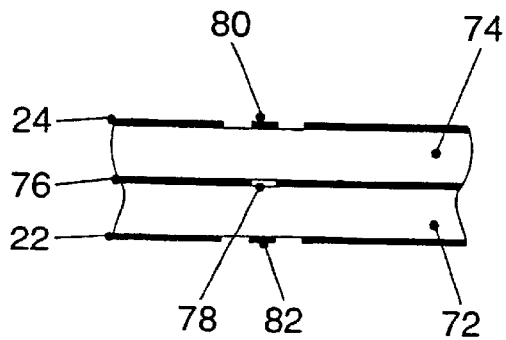
FIG. 8 is a cross-sectional detail view of the radar antenna illustrated in FIG. 7.

The positioning and shape of a coupling slit 78 and two connecting points 80 and 82 is also illustrated in FIG. 8. Since coupling slit 78 only stipulates a limited spatial region for electromagnetically coupling the two connecting points 80 and 82, rows 70 are first of all energized in a precisely defined manner, and secondly, effective shielding is ensured in the regions outside coupling slits 78.

The control of group antenna 24 as a transmitting antenna is described above, in which case the electromagnetic signals travel from Rotman lens 22 to group antenna 24. When group antenna 24 is used as a receiving antenna, the signals propagate in the reverse direction.

Figure 9:
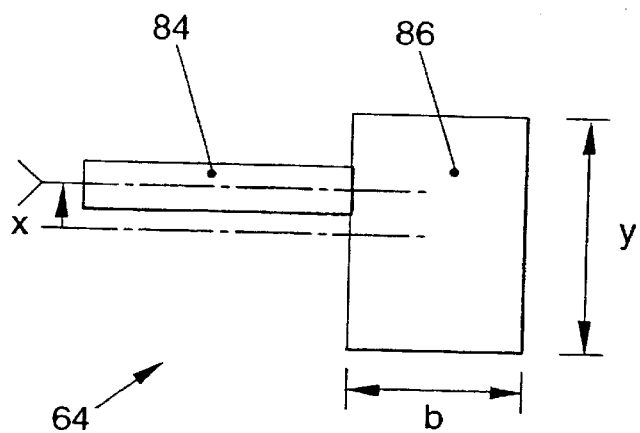
FIG. 9 is a plan view of an individual antenna.
Figure 10:
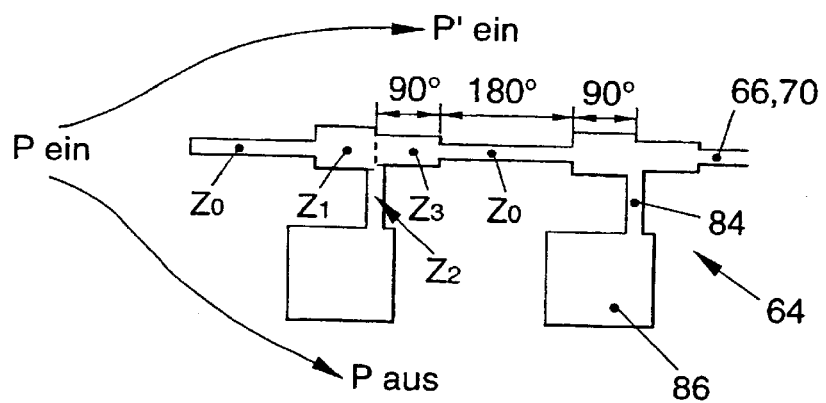
FIG. 10 is a plan view of a detail cut away from a row of individual antennas.
Figure 11:
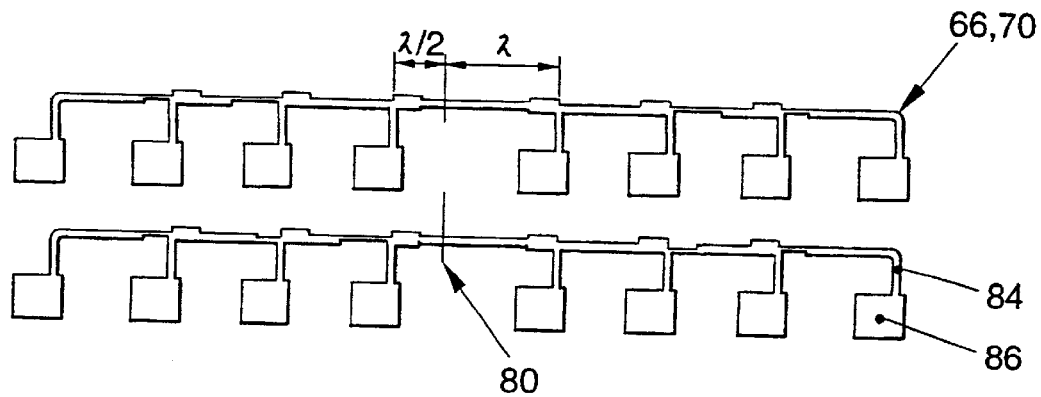
FIG. 11 is a plan view of two rows of individual antennas, in which the position of the coupling slits is illustrated.

A more precise refinement of the individual antennas, as well as of rows 70 and 66 of individual antennas 64, is illustrated in detail in FIGS. 9 to 11.

FIG. 9 illustrates an individual antenna 64, which has a lead 84 that is in the form of a microstrip transmission line, and has a radiating surface 86 that is also referred to as a patch. The length of radiating surface 86, which is indicated by y in FIG. 9, is predetermined by the frequency of the high-frequency signal and essentially corresponds to half the wavelength of the radiation in the substrate. However, width (b) and relative position of the supply point (x) may be selected within limits, the two parameters being matched to each other in order to ensure effective entrance adaptation. The edge of radiating surface 86 denoted by y is also designated as a non-radiating side of radiating surface 86, and the two edges denoted by b are designated as radiating sides of the radiating surface. The two parameters, width (b) and length (y), may be changed within limits, whereby the magnitude of the power tapped from row 70 or 66 for the specific individual antenna 64, and also the amplitude distribution inside row 70 or 66, are adjustable.

To control a row 70 (or 66) of individual antennas 64, a supply network is configured in the form of a three-gate series circuit, as is illustrated in FIG. 10. A triple gate includes two $\lambda/4$ transformers and an individual-antenna branch. On the condition that all individual antennas 64 operate in phase, the decoupling points may therefore be electrically spaced 360° from one another. Therefore, the connecting piece between two triple gates may produce an electrical phase shift of 180°. In addition, the individual triple gates are configured in such a manner that a specific portion of power Pin in the supply line is decoupled into the lead of individual antenna 64, as a function of the desired amplitude distribution of individual antennas 64 along row 70.

The following equations are valid for the individual impedances, in the case of a fixed portion $\alpha$ to be decoupled and a freely selected impedance level $Z_0$ of the supply line:

$Z_1 = \sqrt{\alpha Z_0 Z_2}$ $Z_3 = \sqrt{\alpha(1-\alpha)^{-1} Z_0 Z_2}$

It can be inferred from the formulas that, in addition to impedance level $Z_0$, the portion of the decoupled power may also be freely selected. $Z_2$ is the impedance level of lead 84 of individual antenna 64, while $Z_0$ may be referred to as the impedance level of the supply line.

Apart from the configuration of branched individual antennas illustrated in FIG. 10, the individual antennas may also be arranged in series or threaded inside the line. The amplitude of each decoupled signal is then controlled by the width of the radiating surfaces.

The positioning of connecting points 80 along two rows 70 is illustrated in FIG. 11. Connecting points 80 are essentially situated in the center of rows 70, where, as illustrated in FIG. 11, a subdivision into $\lambda/2$ and $\lambda$ is performed in order to ensure that the individual antennas 64 situated on the left and right of connecting point 80 are in phase, when electromagnetic waves propagate along rows 70 in two different directions.

In the above-described example embodiments of radar antenna 4, the substrates of Rotman lens 22 and group antenna 24 are produced from a ceramic-filled composite of polytetrafluoroethylene (PTFE). This allows a flexible configuration of both radar antenna 4 and radar sensor 2.

If substrates 72 and 74 also have different dielectric constants, then the size of Rotman lens 22 may be decreased independently of the dimensions predetermined by the external shape of group antenna 24, when a high dielectric constant is used.

It should be pointed out that, in the case of the second radar-antenna example embodiment illustrated in FIG. 7, the routing of the delay lines may be selected within the framework of the arrangement. However, these delay lines 62 may be selected in a manner described with regard to the first example embodiment illustrated in FIG. 6. Therefore, the adjustment of the signal propagation times represents an additional option for the radar antenna 4 according to the second example embodiment.

What is claimed is:

1. A radar sensor, comprising:
   a control circuit configured as at least one of a transmitting module and a receiving module, the control circuit including at least one monolithic millimeter-wave integrated circuit component; and
   at least one radar antenna connected to the control circuit by at least one lead, the radar antenna including a Rotman lens and a group antenna;
   wherein the control circuit and the radar antenna are arranged substantially in parallel with each other.

2. The radar sensor according to claim 1, wherein the radar sensor is configured to monitor a vicinity of a motor vehicle.

3. The radar antenna according to claim 1, wherein the control circuit and the radar antenna are arranged substantially in a single plane.

4. The radar antenna according to claim 1, further comprising:
   a conductor support; and
   lines configured to transmit high-frequency signals between the control circuit and the at least one lead of the radar antenna arranged on the conductor support;
   wherein the conductor support is arranged between the control circuit and the radar antenna.

5. The radar antenna according to claim 4, wherein the lines are arranged substantially in a plane parallel to printed circuit traces of the control circuit and to the at least one lead.

6. The radar sensor according to claim 4, wherein the lines are arranged substantially at a same elevation as printed circuit traces of the control circuit and the at least one lead.

7. The radar sensor according to claim 4, wherein the lines include microstrip transmission lines on the conductor support.

8. The radar sensor according to claim 4, wherein the conductor support is formed of GaAs.

9. The radar sensor according to claim 4, further comprising a circuit support, the at least one monolithic millimeter-wave integrated circuit component of the control circuit, the conductor support and at least part of the radar antenna connected to the circuit support.

10. The radar sensor according to claim 9, wherein the at least one monolithic millimeter-wave integrated circuit component of the control circuit, the conductor support and the part of the radar antenna are connected to the circuit support by an adhesive.

11. The radar sensor according to claim 9, wherein a material of the circuit support is adapted to thermal expansion properties of a substrate of the monolithic millimeter-wave integrated circuit component of the control circuit, of the conductor support and of the radar antenna.

12. The radar sensor according to claim 9, wherein the circuit support is formed of $AL_2O_3$.

13. The radar sensor according to claim 9, further comprising lines configured to transmit signals between the lines of the conductor support and the leads of the radar antenna arranged on a substrate of the circuit support.

14. The radar sensor according to claim 4, further comprising wire-bonding connections arranged between the lines and the at least one lead of the radar antenna.

15. The radar sensor according to claim 4, further comprising electromagnetic field couplings arranged between the lines and the at least one lead of the radar antenna.

16. A radar antenna, comprising:
   a Rotman lens having a lenticular parallel-plate line, at least two supply leads, a plurality of coupling leads and delay lines; and
   a group antenna including a plurality of individual antennas each connected in series in at least two rows, each row connected to a delay line via an antenna terminal;
   wherein a delay line, configured to transmit a high-frequency signal supplied by the parallel plate line to a corresponding coupling lead to the row of individual antennas is provided for each row of individual antennas;
   wherein for a specified frequency of the high-frequency signal, a length of the delay lines is selected so that signals having a predetermined phase distribution are applied to antenna terminals in response to applying the high-frequency signal to each of the supply leads; and
   wherein a signal propagation delay occurring between the supply leads and the antenna terminals are changeable for different delay lines, for a predetermined frequency of the high-frequency signal, by substantially integral multiples of signal periods, to preselect an amplitude distribution of signals applied to the antenna terminals.

17. The radar antenna according to claim 16, wherein signal propagation times for outer delay lines are increased in comparison to inner delay lines.

18. The radar antenna according to claim 16, wherein signal propagation times along the delay lines are predetermined in accordance with one of different lengths of the delay lines and different dielectric constants of substrates of the delay lines.

19. The radar antenna according to claim 16, wherein each delay line is connected to one of two ends of the rows of individual antennas.

20. The radar antenna according to claim 16, wherein the Rotman lens and the group antenna are formed on a single substrate.

21. The radar antenna according to claim 20, wherein the substrate is formed of a ceramic-filled composite of polytetrafluoroethylene.

22. The radar antenna according to claim 16, wherein the Rotman lens and the group antenna are arranged substantially in a single plane.

23. A radar antenna, comprising:
a Rotman lens having a lenticular parallel-plate line, at least two supply leads, a plurality of coupling leads and delay lines; and
a group antenna having a plurality of individual antennas, each connected in series in at least two rows;
wherein the Rotman lens and the group antenna are spaced apart from each other and positioned substantially in parallel with each other.

24. A radar antenna comprising:
a Rotman lens having a lenticular parallel-plate line, at least two supply leads, a plurality of coupling leads and delay lines; and
a group antenna having a plurality of individual antennas, each connected in series in at least two rows;
wherein the Rotman lens and the group antenna are spaced apart from each other and positioned substantially in parallel with each other; and
wherein the Rotman lens is formed on a first substrate and the group antenna is formed on a second substrate, sides of the two substrates facing away from the Rotman lens and the group antenna interconnected, a common metallic coating arranged between the two substrates.

25. The radar antenna according to claim 24, wherein the metallic coating includes a common ground potential.

26. The radar antenna according to claim 24, wherein the metallic coating includes coupling slits configured to electromagnetically couple connecting points of the rows of individual antennas to connecting points of the delay lines.

27. The radar antenna according to claim 26, wherein the connecting points of the rows of individual antennas are arranged substantially in a center of the rows.

28. The radar antenna according to claim 24, wherein the substrates have different dielectric constants.

29. A radar antenna comprising:
a Rotman lens having a lenticular parallel-plate line, at least two supply leads, a plurality of coupling leads and delay lines; and
a group antenna having a plurality of individual antennas, each connected in series in at least two rows;
wherein the Rotman lens and the group antenna are spaced apart from each other and positioned substantially in parallel with each other; and
wherein the substrates are formed of a ceramic-filled composite of polytetrafluoroethylene.

30. A radar antenna comprising:
a Rotman lens having a lenticular parallel-plate line, at least two supply leads, a plurality of coupling leads and delay lines; and
a group antenna having a plurality of individual antennas, each connected in series in at least two rows;
wherein the Rotman lens and the group antenna are spaced apart from each other and positioned substantially in parallel with each other;
wherein a delay line, configured to transmit a high-frequency signal supplied by the parallel plate line to a corresponding coupling lead to the row of individual antennas is provided for each row of individual antennas;
wherein for a specified frequency of the high-frequency signal, a length of the delay lines is selected so that signals having a predetermined phase distribution are applied to antenna terminals in response to applying the high-frequency signal to each of the supply leads; and
wherein a signal propagation delay occurring between the supply leads and the antenna terminals are changeable for different delay lines, for a predetermined frequency of the high-frequency signal, by substantially integral multiples of signal periods, to preselect an amplitude distribution of signals applied to the antenna terminals.

* * * * *